United States Patent [19]

Kohara

[11] 3,916,396

[45] Oct. 28, 1975

[54] BUBBLE DOMAIN CIRCUIT

[75] Inventor: Haruki Kohara, Tokyo, Japan

[73] Assignee: Nippon Electric Company, Ltd., Tokyo, Japan

[22] Filed: June 25, 1974

[21] Appl. No.: 482,964

[30] Foreign Application Priority Data

June 25, 1973 Japan ............................... 48-71572

[52] U.S. Cl. ...................... 340/174 TF; 340/174 SR

[51] Int. Cl.² ................... G11C 11/14; G11C 19/08

[58] Field of Search ................. 340/174 TF, 174 SR

[56] References Cited

UNITED STATES PATENTS

| | | | |
|---|---|---|---|
| 3,618,054 | 11/1971 | Bonyhard et al. | 340/174 TF |
| 3,792,450 | 2/1974 | Bogar et al. | 340/174 TF |
| 3,806,901 | 4/1974 | Buhrer | 340/174 TF |
| 3,828,330 | 8/1974 | Parzefall | 340/174 TF |

*Primary Examiner*—Stanley M. Urynowicz, Jr.
*Attorney, Agent, or Firm*—Sughrue, Rothwell, Mion, Zinn & Macpeak

[57] ABSTRACT

A magnetic bubble domain memory of the major loop and minor loop type is constructed of thin film elements placed on an orthoferrite or the like material for retaining bubble domains. The pattern of the overlay elements is such that gate elements normally used between major and minor loops may be eliminated and storage elements may be part of the major loop and one of the minor loops. In-plane magnetic fields of a sequential and pulsed nature are applied to the material. The sequence and magnitude of the pulses determines whether the major loop, the minor loop, write-in, or erase propagation paths are effectively operable. Thus, a first pulse sequence will cause domains to circulate in the minor loops but remain stationary in the major loops. A second pulse sequence will cause domains to propagate in the major loop but remain stationary in the minor loop.

12 Claims, 10 Drawing Figures

BUBBLE DOMAIN CIRCUIT

BACKGROUND OF THE INVENTION

The present invention relates to a bubble domain circuit using cylindrical magnetic domains (referred to hereunder as bubble domains) generated in a sheet of orthoferrite or similar magnetic materials, and more particularly, to a bubble domain circuit employed as a memory circuit in information handling systems such as electronic computers, pattern recognition apparatuses and the like.

It has been heretofore known that bubble domains generated in ferrites containing a rate earth element such as "orthoferrite," garnet or other magnetic materials can provide either logic or memory functions. The general properties of an orthoferrite are described in detail in "Bell System Technical Journal," Oct. issue, 1967, pp. 1901–1925. A so-called "major-minor loop" type bubble domain circuit is fully disclosed in "IEEE TRANSACTIONS ON MAGNETICS," Vol. MAG-6, No. 3, Sept. issue, 1970, pp. 447–451.

In the major-minor loop type bubble circuit, the bubble domains in a major loop and minor loops propagate simultaneously in synchronism with the rotation of the in-plane magnetic field. Therefore, if a bubble domain pattern representing information is once transferred from a minor loop to the major loop via a gate, then a vacant bit is created in the minor loop. This vacant bit is propagated along the minor loop during the shift operation in the major loop. Accordingly, in the case where the information on the major loop is to be returned to the minor loop, it is necessary to adjust a timing relationship so that the vacant bit in the minor loop may coincide with each information bit in the major loop at the gate position. In one conventional bubble domain circuit, this difficulty was obviated by equalizing the length of each minor loop and that of the major loop. However, with the use of a bubble domain circuit constructed in such a manner, there have been some disadvantages. The circuit construction must be restricted because the lengths of the major and minor loops cannot be selected arbitrarily. Also, the access time cannot be minimized. Moreover, in the conventional major-minor type bubble circuit, conductor loops for gate control have been used not only for connection between the major and minor loops, but also for connection between the bubble generator, the bubble eraser, and the major loop. Consequently, in the prior art circuit, there are the disadvantages that the reliability of the circuit is lowered, and the efficient utilization of the circuit area as well as cost reduction of the circuit cannot be achieved.

It is, therefore, one object of this invention to provide a bubble domain circuit free from the above-mentioned disadvantages.

SUMMARY OF THE INVENTION

The bubble domain circuit of the present invention comprises: a sheet of magnetic material capable of retaining bubble domains; means for applying a biasing magnetic field normal to the sheet; means for generating in-plane magnetic fields parallel with the surface of the sheet; and a ferromagnetic thin film overlay circuit disposed adjacent to the sheet in which a plurality of minor loops serving as circulating memory loops, a major loop serving as a circulating transfer loop commonly including at least one bit in each one of the minor loops, and an eraser circuit and a generator circuit, respectively, connected to the transfer loop whereby each part of the overlay circuit can be independently controlled depending on magnitude and direction of the in-plane magnetic fields. In the bubble domain circuit according to the present invention a standard ferromagnetic thin film overlay is used as a circuit element of substantially point-symmetrical shape capable of performing selective shift control by the use of in-plane magnetic fields. Therefore, the gates in the conventional bubble circuits can be completely eliminated. Furthermore, in the circuit of the present invention, because the major and minor loops can be driven entirely independent of each other, the timing adjustment as required in conventional bubble circuits becomes unnecessary. As a result, the circuit construction can be freely made without any restriction, the reduction of access time in addition to efficient utilization of the circuit area may be realized, and the cost of the circuit will be lower.

BRIEF DESCRIPTION OF THE DRAWINGS

The present invention will now be described in conjunction with the accompanying drawings, wherein.

DETAILED DESCRIPTION OF THE PREFERRED EMBODIMENT

Figure 1A:
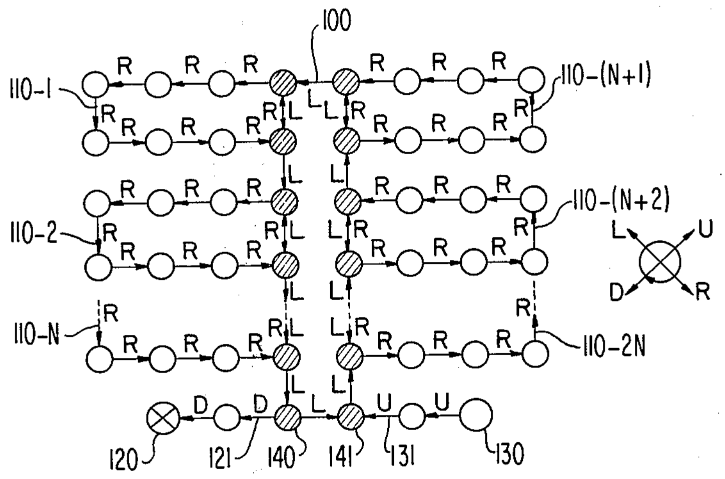
FIG. 1A shows a schematic construction diagram of the present bubble domain circuit.

In FIG. 1A, each black and white circle represents one memory cell in a ferromagnetic thin film overlay circuit, and solid lines connecting these memory cells represent propagation paths between the cells. Arrow heads attached to the propagation paths indicate the directions in which the bubble domains in the respective memory cells are shifted, and letters R, D, L and U marked along the propagation paths, respectively, represent the fact that the in-plane magnetic fields to be applied in parallel with the overlays as shown by the corresponding reference letters in the right-hand portion of the drawing are employed as shift control for the corresponding propagation paths. A loop consisting only of the black circles forms a major loop 100 serving as a circulating transfer loop. Loops located on both sides of the major loop 100 and consisting of respective two memory cells in the major loop 100 and memory cells represented by the white circles, form minor loops 110-1 to 110-2N serving as 2N circulating memory loops. In addition, a propagation path 121 (called "eraser path") extending from a memory cell 140 (corresponding to an output cell) in the major loop 100 to an eraser 120, and another propagation path 131 (called "input path") extending from a generator 130 to a memory cell 141 (corresponding to an input cell) in the major loop 100 are formed on a sheet of magnetic material (not shown). The combination of the eraser 120 and the propagation path 121 is called an eraser circuit, while that of the generator 130 and the propagation path 131 is named a generator circuit. The eraser 120 is used to absorb and erase a bubble domain, and the generator 130 generates a bubble domain pattern corresponding to input information (for instance, the presence and absence of each domain corresponds to "1" and "0", respectively. Though, not shown in FIG. 1A, a detector circuit for detecting the presence of a domain is connected to the output cell 140 in the major loop 100.

Figure 1B:
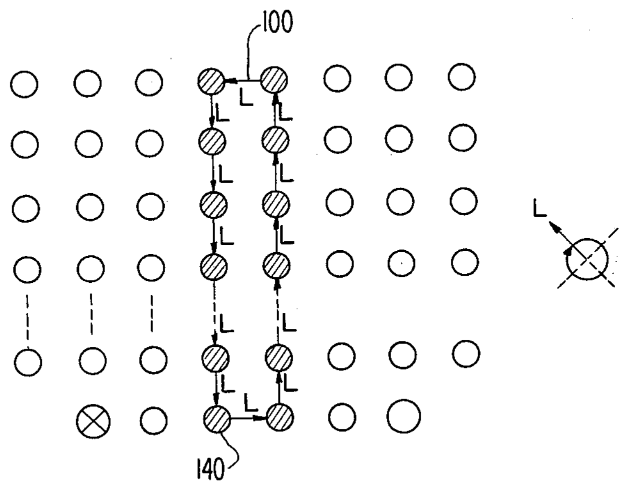
FIGS. 1B to 1E show diagrams for explaining the principle of operation of the present bubble domain circuit.

FIG. 1B shows the formation of a propagation loop in the case where the bubble domain circuit in FIG. 1A operates under control of the in-plane magnetic field in the L-direction in order to perform only a shift operation in the major loop 100. This in-plane magnetic field is applied in a pulse form and it is hereinafter referred to as "shift control pulse L". During this time, the domains in the remaining memory cells are kept stationary because no propagation path is formed therefor. As a result, this operation is convenient for independently shifting only the domains in the major loop 100, and it is available for transferring a domain pattern to the output cell 140 for detection or write-in, or for making a domain pattern supplied from the input cell 141 circulate around the major loop 100.

Figure 1C:
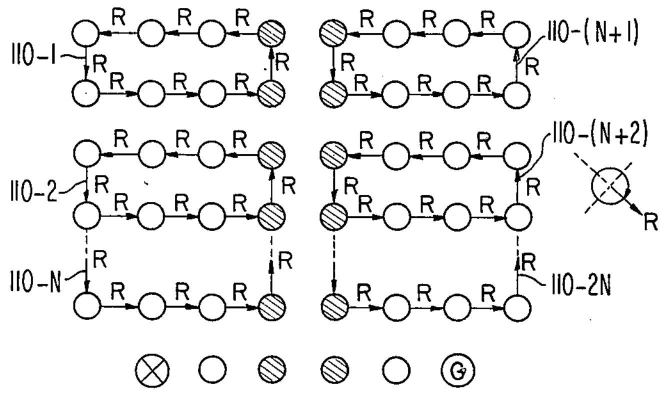

FIG. 1C shows the formation of propagation loops in the case where only a shift control pulse R is applied. In this case, the circulation of only the domains in the minor loops 110-1 to 110-2N is made possible and the domains in the remaining memory cells are kept stationary. Therefore, the latter shift operation is used for transferring a domain pattern from the minor loops 110-1 to 110-2N to the desired positions in the major loop 100.

Figure 1D:
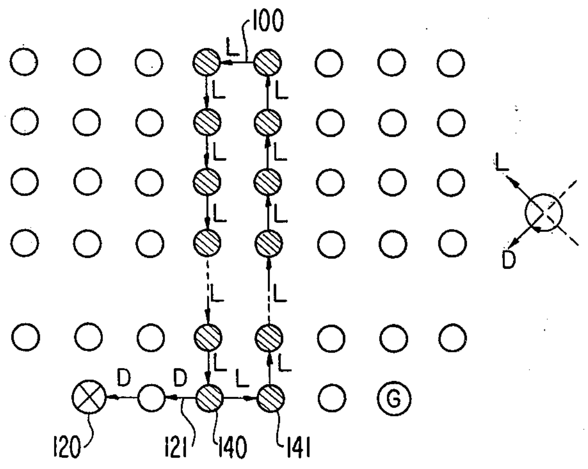

FIG. 1D shows the formation of a propagation loop and a propagation path obtainable when the shift control pulses D and L are alternately applied to the bubble domain circuit in FIG. 1A. In this case, the eraser path 121 is actuated by the shift control pulse D to lead the domain on the output cell 140 to the eraser 120. On the other hand, the shift control pulse L actuates the major loop in a similar manner to that shown in FIG. 1B. Since these shift operations are performed independent of each other, the alternate application of the shift control pulses D and L is used for the so-called "clear" operation in which the domain pattern in the major loop 100 is cleared. In this case, no domain is propagated from the output cell 140 to the input cell 141.

Figure 1E:
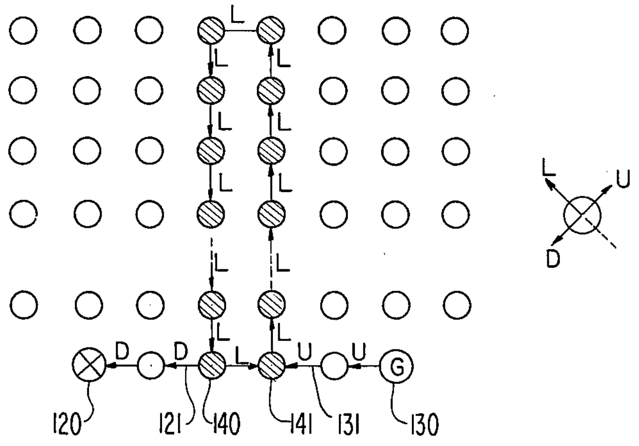

FIG. 1E illustrated the shift operations for changing information stroed in the major loop 100. These operations are performed by sequentially applying the shift control pulses D-L-U. The operations based on the consecutive shift control pulses D-L are used for the clear operation as described previously with reference to FIG. 1D. As a result, no domain appears on the input cell 141. Accordingly, by the application of the subsequent shift control pulse U in response to input information, a new domain pattern generated in the generator 130 is introduced to the input cell 141 via the input path 131. When the shift control pulse U is not applied, no domain pattern is introduced to the input cell 141. Each time the shift control pulse L is applied, the new information is propagated around the major loop 100 in the counterclockwise direction.

As has been mentioned above, by combining four shift control pulses R, D, L and U, all the functions required for a memory device such as independent shift of a major loop, independent shift of minor loops, and the clear and write-in operations for the major loop 100 are provided. Therefore, the above-described bubble domain circuit can be used as a memory device. The present circuit has the remarkable feature that the respective propagation loops are independently formed by the corresponding shift control pulses singly or in combination. Thus, there is no need to adjust the loop length in the present circuit as compared with the conventional major-minor type bubble circuits. As a result, major and minor loops having any arbitrary lengths can be constructed according to the present invention, thereby enhancing the versatility of bubble domain circuits. In addition, memory cells forming a part of the major loop also function as memory cells in the minor loops so that the conductor gates, which cause degradation of reliability in the prior art bubble circuits, can be eliminated with the results of efficient utilization and excellent reliability of the circuit. Moreover, because in the present circuit, not only the generation and erasure of domains but also independent shifts in the major and minor loops can be performed by means of only the shift control pulse magnetic fields without employing conductor gates at all, the circuit has a great advantage that the construction and control of the memory device can be extremely simplified. This advantage would greatly reduce the defects of the conventional major-minor type bubble circuits.

Figure 2A:
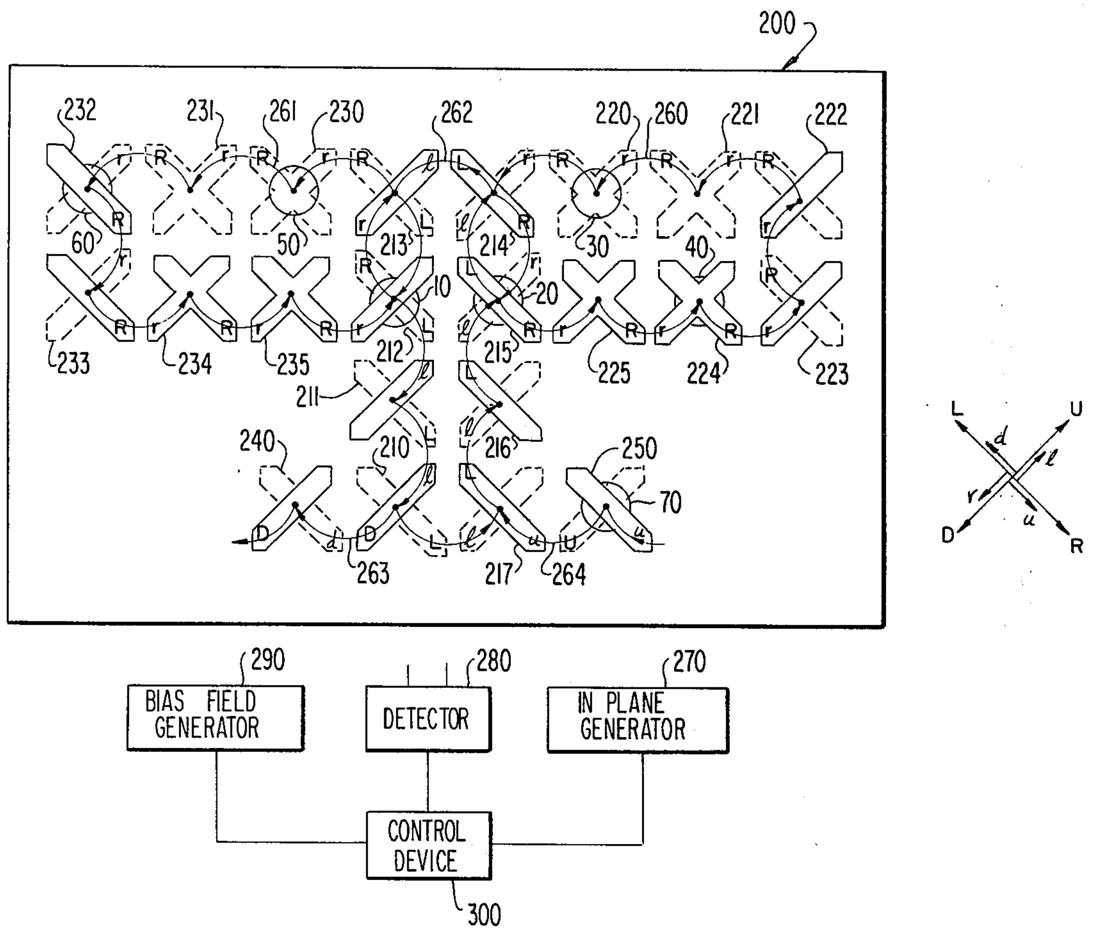
FIG. 2A shows a diagram of one embodiment of this invention.
Figure 2B:
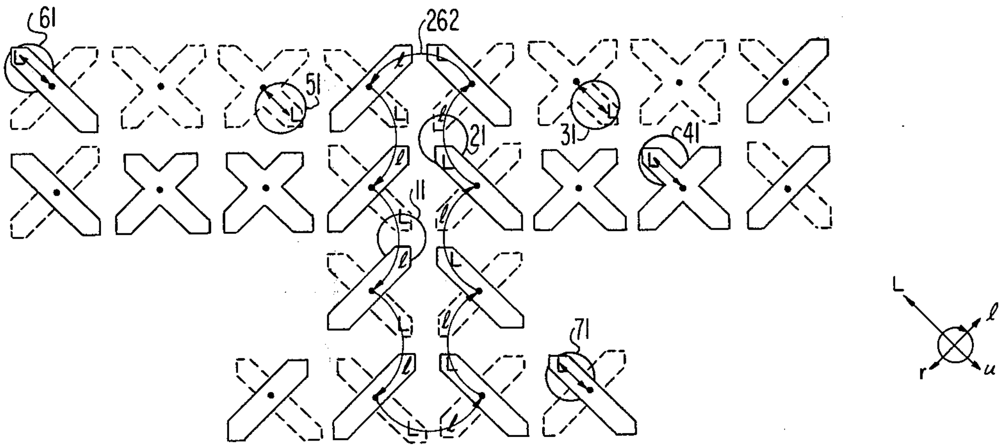
FIGS. 2B to 2E show diagrams for explaining the circuit operation of FIG. 2A more in detail.

In FIG. 2A which illustrates one embodiment of this invention there is illustrated a sheet of magnetic material 200 capable of retaining bubble domains and ferromagnetic thin film overlays 210–217, 220–225, 230–235 and 240–250 (memory cells), which can be formed of permalloy, are disposed either directly or indirectly on both surfaces of the sheet 200. The thin film overlays represented by solid lines are disposed on the top surface of the sheet (as illustrated in the front surface of paper), while thin film overlays represented by dashed lines are disposed on the bottom surface of the sheet. The configuration of these thin film overlays are of the so-called "X—X type." The center position of each X is used for holding a domain as exemplified by domains 10, 20, 30, 40, 50, 60 and 70 in the respective overlays 212, 215, 220, 224, 232 and 250, and the spatial magnetic field distribution generated by the magnetic poles at the ends of the thin film overlays is used as means for shifting the domains. Detailed explanation of the X—X type of thin film overlays is described in the copending U.S. pat. application No. 429,340 (Inventor: Haruki Kohara), filed Dec. 28, 1973 and assigned to the same assignee as the present application. A biasing magnetic field for retaining domains generated by a biasing magnetic field generator 290 is externally applied to the sheet 200, and an in-plane magnetic field for propagating the domains by generated in-plane magnetic field generator device 270 is applied to the sheet 200. The biasing magnetic field is perpendicular to the surface of sheet 200, and in this example, is considered to be in the direction from the back surface to the front surface of the drawing. The direction of magnetization of the bubble domains in the sheet 200 is opposite to the direction of the biasing magnetic field, and therefore, the direction of magnetization is directed from the top surface to the back surface of the drawing. In this case, the S-magnetic poles of the domains appear on the top surface of the sheet 200 and the N-magnetic poles of the domains appear on the bottom surface of the sheet 200.

The in-plane magnetic field applied in a pulse form (a pulsating or pulsed magnetic field) is as a magnetic field varying with time along the surface of the sheet 200. As a result, the magnetic poles at the tip of the respective X-shaped thin film overlays vary spatially in accordance with the variation in magnitude and direction of the in-plane magnetic field, so that the magnetic field distribution in the sheet 200 varies spatially and the variation of the field distribution is utilized to cause a bubble domain on one memory cell to shift to an adjacent memory cell.

In the right end portion of FIG. 2A, it is assumed that the arrow marks shown in FIG. 2A to the right of sheet 200 indicate the directions of the in-plane pulse magnetic fields and that the pulse magnetic fields of small amplitude are sequentially applied in the order r-d-l-u (clockwise) by superimposing one of them upon the next one in the directions of the projections of the X-shaped thin film overlays as shown by solid and dashed lines in the sheet 200. It is also assumed that these pulse magnetic fields of small amplitude (small pulse magnetic fields) are switched according to the requirement to the pulse magnetic fields of large amplitude (main pulse magnetic fields R, D, L and U corresponding to the shift control pulses R, D. L and U. respectively, in FIG. 1A) which are sequentially applied clockwise). For instance, if the shift control pulses R, L, D and U or the shift control sequences D-L and D-L-U are required, the magnetic field sequences R-*r*-*d*-*l*, L-*l*-*u*-*r*, D-*d*-*l*-*u* and U-*u*-*r*-*d* or D-L-1-*u* and D-L-U-*u* are used, respectively. Then, at the tip of each projection of the X-shaped thin film overlay appears a magnetic pole corresponding to the component of the applied pulse magnetic field in the direction of the projection. In the drawing, the strong and weak magnetic poles corresponding to the main and small pulse magnetic fields are generated on the respective X-shaped thin film overlays as shown by letters R, D, L and U, respectively, and letters *r*, *d*, *l* and *u*, respectively. For instance, if the pulse magnetic fields R and *r*, D and *d*, L and *l* or U and u are successively applied and superimposed on each other, the strong and weak magnetic poles are generated at the respective positions R and *r*, D and *d*, L and *l* or U and *u* on the X-shaped overlays. In the illustrated embodiment, it is to be noted that on the X-shaped overlays on the top surface as represented by solid lines, N-magnetic poles are generated at the magnetic pole positions R and *r*, D and *d*, L and *l*, or U and *u*, respectively, while on the X-shaped overlays on the bottom surface as indicated by dashed lines, S-magnetic poles are generated at the magnetic pole positions R and *r*, D and *d*, L and *l*, or U and *u*, respectively. Thus, a domain having its S-magnetic pole on the top surface of the sheet 200 and its N-magnetic pole on the bottom surface of the sheet is attracted to these magnetic pole positions an further moves from the strong magnetic pole position to the weak magnetic pole position, that is, R to *r*, D to *d*, L to *l*, and U to *u* every time the pulse magnetic fields are applied in parallel with the sheet 200. Moreover, in the above-mentioned relations, if the pulse magnetic fields *r*, *d*, *l* and *u* or R, D, L and U are replaced by the magnetic fields D, L, U and R or *u*, *r*, *d* and *l*, respectively, a domain moves from the strong magnetic pole position to the adjacent strong magnetic pole position or the weak magnetic pole position to the adjacent weak magnetic pole position (omitted for the simplicity of the drawing), that is, toward R-D, D-L, L-U and U-R or *u*-*r*, *r*-*d*, *d*-*l* and *l*-*u* every time the pulse magnetic fields are applied in parallel with the sheet 200. However, between the particular X-shaped overlays (such as the overlays 211 and 216) whose projections are shortened to broaden the distance between the strong magnetic pole position and the adjacent strong or weak magnetic pole position opposed to each other, the shift of the domain is inhibited. Accordingly, in the illustrated bubble domain circuit, the paths through which domains can be propagated in response to the application of the four main pulse magnetic fields R, D, L and U and the small pulse magnetic fields *r*, *d*, *l* and *u* which are superimposed on the corresponding main pulse magnetic fields are restricted, so that only propagation paths 260 to 264 can exist as shown by arrow-marked thin lines.

In FIG. 2A, the memory cell 215 and 214 and 220 to 225 arranged along the propagation path 260 constitute a first minor loop, while the memory cells 212 and 213 and 230 to 235 disposed along the propagation path 261 form a second minor loop. These cells correspond to the minor loops 110-1 to 110-2N in FIGS. 1A and 1C, and they are driven by only the pulse magnetic field sequence R-*r*-*d*-*l*. On the other hand, the memory cells 210 to 217 disposed along the propagation path 262 construct a major loop corresponding to the major loop 100 in FIGS. 1A, 1B, 1D, and 1E. Although this major loop can be driven by the application of only the pulse magnetic field sequence L-*l*-*u*-*r*, particularly, the memory cells 212, 213 and 214, 215 function also as constituents in the second and first minor loops, respectively, and simultaneously, they can be shifted also by means of the pulse magnetic field sequence R-*r*-*d*-*l*. Thus, by using the memory cells in common in minor loops and a major loop, the switching of transfer between the major loop and the minor loop can be carried out very smoothly. Also, since such switching can be readily realized by the pulse magnetic field sequence R-*r*-*d*-*l* and L-*l*-*u*-*r*, there occurs an advantage in the present circuit that the use of conductor loops can be avoided as compared with the prior art circuits. In addition, it is easily understood that circuit area can be saved with the present invention.

The propagation path 263 constitutes an eraser path extending from the memory cell 210 in the major loop 262 via the memory cell 240 to an eraser for absorbing bubble domains, and leads a domain on the memory cell 210 (corresponding to an output cell) to the eraser in response to the application of the pulse magnetic field sequence D-*d*-*l*-*u*. On the other hand, the propagation path 264 forms an input path extending from a generator for generating bubble domains through the memory cell 250 to the memory cell 217 in the major loop 262, and leads a domain supplied by the generator to the memory cell 217 (corresponding to an input cell) by the application of the pulse magnetic field sequence U-*u*-*r*-*d*. Although the eraser and the generator are omitted in FIG. 2A for simplicity of the drawing, the well-known eraser and generator circuits such as those disclosed in IEEE TRANSACTIONS ON MAGNETICS, Vol. MAG-5, No. 3, Sept. issue, 1969, pp. 544–558 may be used. In addition, a conventional detector can be disposed on the memory cell 210 in the major loop 262 for detecting whether or not a bubble domain exists on the cell and converting the detected results to electrical signals. The detector is omitted from FIG. 2A for simplicity of the drawing. Examples of suitable prior art detectors are, a magnetic resistance element employing permalloy overlays, a Hall element employing semiconductors, and the like. The electrical signals obtained by the detector are amplified and wave-shaped in a detector device 280, and then fed to a signal utilization circuit (not shown).

In FIGS. 2B to 2E which are useful in explaining the operation of the bubble domain circuit of FIG. 2A more in detail, the relevant X-shaped overlays are shown and the in-plane pulse magnetic fields are indicated in the right-hand portion.

Assuming here that the state of FIG. 2A is initially set by the application of only the small pulse magnetic field sequence *r-d-l-u*, the bubble domains 10 to 70 are maintained at the centers of each memory cell as shown in FIG. 2A. However, when the pulse magnetic field sequence L-*l-u-r* including the main pulse magnetic field L is applied, only the domains 10 and 20 in the major loop along the path 262 are propagated as shown by arrow-marked thin line as domains 11 and 21. On the other hand, the domains 30 to 70 along other paths are kept within the previous cells as shown by arrow-marked thin line as domains 31 to 71, respectively.

Thus, the shift operation in the major loop 262 corresponding to that illustrated in FIG. 1B is performed by the application of pulse magnetic field sequence L-*l-u-r*.

Figure 2C:
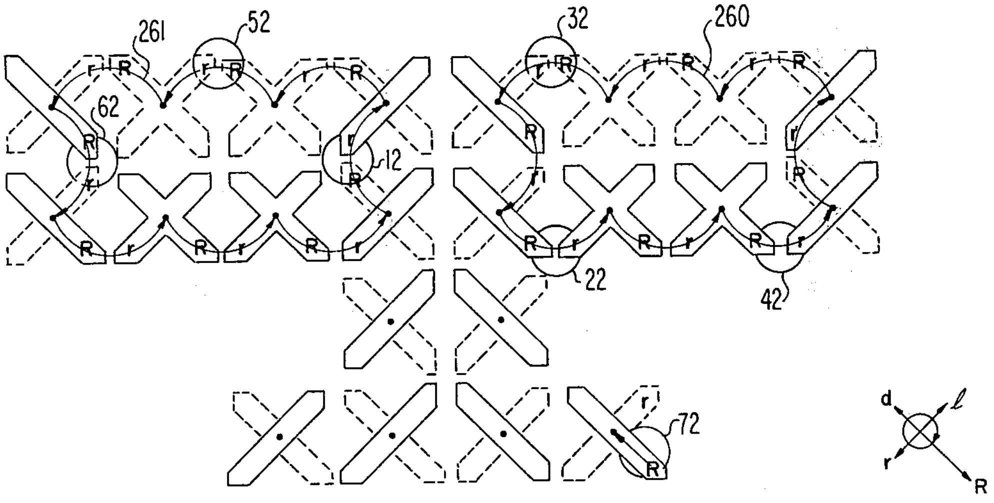

In FIG. 2C which shows the operation of the minor loops in the case where the pulse magnetic field sequence R-*r-d-l* are sequentially applied to the overlays by superimposing one of them on the next one, the domains 10 to 60 move in the minor loops 261 and 260, respectively.

In FIG. 2C, the state of each domain after transition is shown as domains 12 to 62. The domain 70 on the memory cell 250 has no path to move, and as a result, it is held as a domain 72 on the small cell.

In this way, the shift operations in the minor loops 260 and 261 corresponding to those illustrated in FIG. 1C are carried out by the application magnetic of field sequence R-*r-d-l*.

Figure 2D:
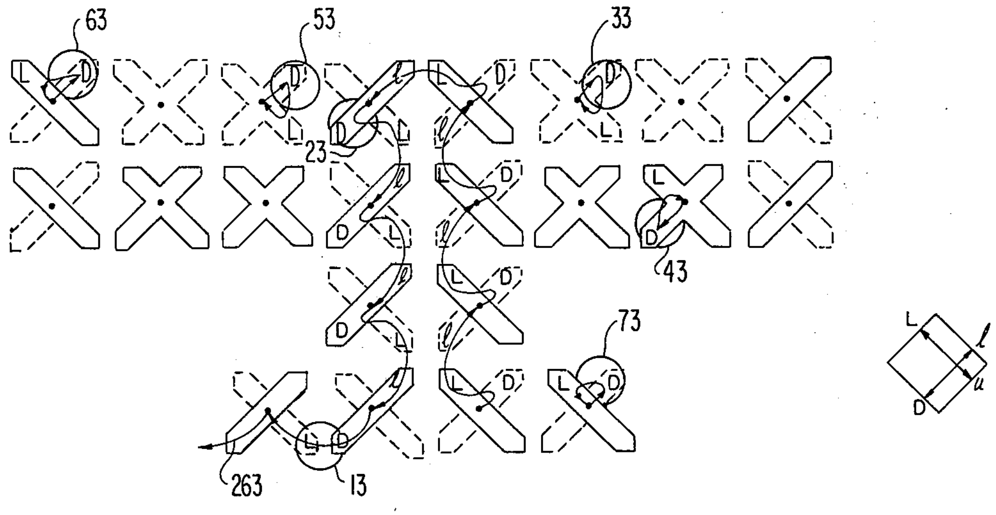

In FIG. 2D which illustrated the clear operation of transferring domains in the major loop 262 to the eraser the sequential and superimposing pulse magnetic field sequence D-L-*l-u* is applied. In the output cell 210, the operation for leading the domains to the eraser path 263 is preferentially carried out by the pulse magnetic field sequence D-L-*l-u*, and in the remaining cells on the major loop 262, only the shift operation of the major loop 262 is performed. The transition state of the domains in FIG. 2A after three cycles of the pulse field sequence D-L-*l-u* is shown in FIG. 2D. The domains 30 to 70 remain held in the minor loops and are shown as 33 to 73, respectively.

Figure 2E:
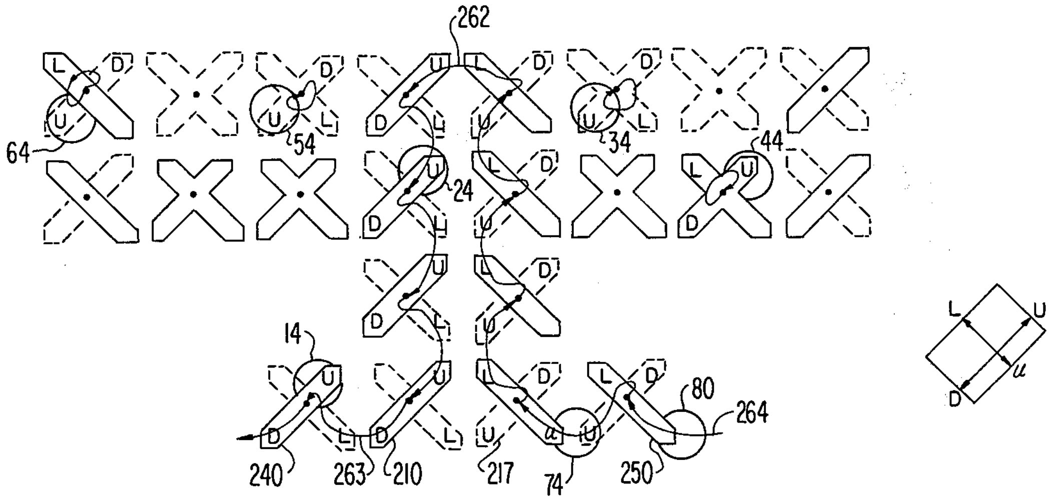

In FIG. 2E which illustrates the state during the write-in operation carried out by the pulse magnetic field sequence D-L-U-*u*, the domain 24 in the major loop 262 will move to the output cell 210. At the same time, the domain 14 in the eraser path 263 is propagated to the eraser. The domain 74 in the cell 250 is introduced to the cell 217 in the major loop 262. Simultaneously, a fresh domain 80 from the generator is supplied to the cell 250 in order to prepare the following write-in operation. If the U pulse magnetic field is not applied, a domain in cell 250 will not move to the main loop input cell 217.

In this way, the write-in operation corresponding to that described in FIG. 1E is accomplished by the application of magnetic field sequence D-L-*l-u* and D-L-U-*u*.

During these operations, the bubble domains on the memory cells for which propagation paths are not established, are held substantially stationary, and therefore there is no need to make the loop lengths of the major and minor loops coincide with each other. A control device 300 shown in FIG. 2A is used to control the operations of the in-plane magnetic field generator device 270, the detector device 280 and the biasing magnetic field generator device 290.

As is apparent from the foregoing, in the embodiment of the present invention, the ferromagnetic thin film overlays of the X-shaped configuration have been used therein, but the overlays are not limited to the X-shaped configuration.

It would be apparent, however, that a number of alternatives and modifications can be made within the scope of the present invention defined by the appended claims.

What is claimed is:

1. A bubble domain circuit comprising, a sheet of magnetic material capable of retaining bubble domains, means for applying a biasing magnetic field normal to said sheet, means for generating in-plane magnetic fields parallel with the surface of said sheet and in varying directions, a major loop means disposed on said sheet for circulating bubble domains, said major loop means comprising a first plurality of bubble domain storage elements arranged and disposed to cause bubble domain circulation in said major loop when the magnitude and direction of said in-plane magnetic fields are of a first predetermined sequence, at least one minor loop means disposed on said sheet for circulating bubble domains, said at least one minor loop means comprising a second plurality of bubble domain storage elements arranged and disposed to cause bubble domain circulation in said minor loop when the magnitude and direction of said in-plane magnetic fields are of a second predetermined sequence, said first and second plurality of bubble domain storage elements having at least one such element in common, which common element is in said major loop and said at least one minor loop, said arrangement of said storage elements being such that said first predetermined sequence will not cause bubble domain circulation in said minor loop and said second predetermined sequence will not cause bubble domain circulation in said major loop, and wherein bubble domain transfer between said major and said at least one minor loop is accomplished by changing from one to the other of said first and second sequences when a bubble domain is at a said common storage element.

2. A circuit as claimed in claim 1 wherein each said storage element comprises a ferromagnetic thin film overlay having substantially point-symmetric shape.

3. A circuit as claimed in claim 2 wherein each said ferromagnetic thin film overlay comprises parts on either one or both of the surfaces of the sheet.

4. A circuit as claimed in claim 2 wherein each ferromagnetic thin film overlay has an X-shape

5. A circuit as claimed in claim 1 wherein said sequence of said in-plane magnetic fields are a sequential application of main and small magnetic fields, each succeeding field overlapping in time the preceding field.

6. A circuit as claimed in claim 1 further comprising a plurality of minor loop means disposed on said sheet for circulating bubble domains, each of said minor loops comprising a separate plurality of bubble domain storage elements arranged and disposed to cause bubble domain circulation therein when the magnitude and direction of said in-plane magnetic fields are of said second predetermined sequence, each of said separate plurality of domain storage elements having at least one storage element in common with said major loop.

7. A bubble domain circuit as claimed in claim 6 further comprising an eraser means for erasing bubble domains, and an eraser propagation path means disposed on said sheet for propagating domains from a given storage element in said major loop to said eraser means, said eraser propagation path means comprising a third plurality of bubble domain storage elements, including said given storage element, arranged and disposed to cause bubble domain propagation therein when the magnitude and direction of said in-plane magnetic fields are of a third predetermined sequence.

8. A bubble domain circuit as claimed in claim 7 further comprising a bubble domain generator means for generating bubble domains, and a generator propagation path means disposed on said sheet for propagating domains from said generator means to a selected storage element of said major loop, said generator propagation path means comprising a fourth plurality of bubble domain storage elements, including said selected storage element, arranged and disposed to cause bubble domain propagation therein when the magnitude and direction of said in-plane magnetic fields are of a fourth predetermined sequence.

9. A circuit as claimed in claim 8 wherein said sequence of said in-plane magnetic fields are a sequential application of main and small magnetic fields, each succeeding field overlapping in time the preceding field.

10. A circuit as claimed in claim 8 wherein each said storage element comprises a ferromagnetic thin film overlay having substantially point-symmetric shape.

11. A circuit as claimed in claim 10 wherein each said ferromagnetic thin film overlay comprises parts on either one or both of the surfaces of the sheet.

12. A circuit as claimed in claim 10 wherein each ferromagnetic thin film overlay has an X-shape.

* * * * *